United States Patent [19]

Andrea et al.

[11] 3,948,723

[45] Apr. 6, 1976

[54] DEVICE FOR FACILITATING THE INSERTION AND WITHDRAWAL OF FUEL ASSEMBLIES FROM A NUCLEAR REACTOR

[75] Inventors: Christo Andrea, Windsor Locks; Edward Arnold Siegel, Bloomfield, both of Conn.

[73] Assignee: Combustion Engineering, Inc., Windsor, Conn.

[22] Filed: Jan. 2, 1974

[21] Appl. No.: 430,217

[52] U.S. Cl. ............................ 176/30; 214/18 N
[51] Int. Cl.² .................................. G21C 19/20
[58] Field of Search ................ 176/28, 30, 31, 32; 214/18 N, 17 A, 17 DA

[56] References Cited
UNITED STATES PATENTS

| | | | |
|---|---|---|---|
| 3,044,947 | 7/1962 | Payne | 176/30 |
| 3,073,771 | 1/1963 | Moulin | 176/32 |
| 3,600,277 | 8/1971 | Germer | 176/30 |
| 3,629,062 | 12/1971 | Muenchow | 176/31 |
| 3,768,668 | 10/1973 | Schukei | 214/18 N |

*Primary Examiner*—Samuel Feinberg
*Attorney, Agent, or Firm*—Frederick A. Goettel, Jr.

[57] ABSTRACT

A device is provided which is installed in a reactor prior to carrying out refueling operations and which accurately locates and isolates a selected core location to permit rapid withdrawal and insertion of fuel subassemblies at that location. A shielded plug designed to cooperate with the refueling apparatus is inserted into an access port in the reactor head. A structural shroud extends down from the plug and carries at its lower end a radially floating, hexagonal spreader tube with mechanisms to rotate it for angular alignment purposes and a linear drive for inserting it into the core. The upper end of the spreader tube serves as a guide for leading the fuel handling apparatus into alignment with the chosen subassembly.

4 Claims, 32 Drawing Figures

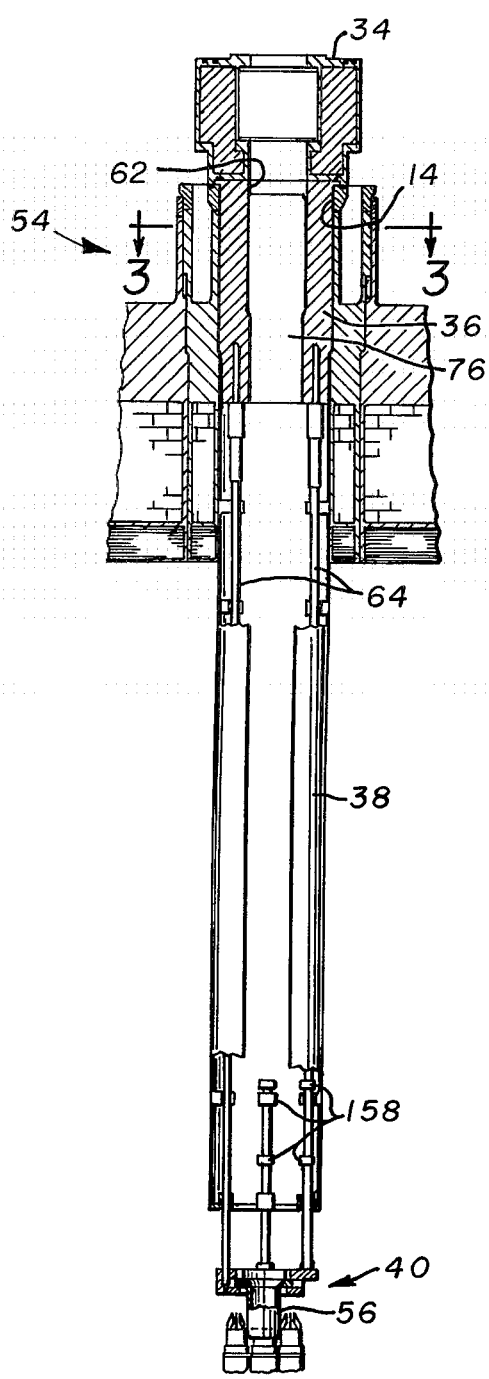
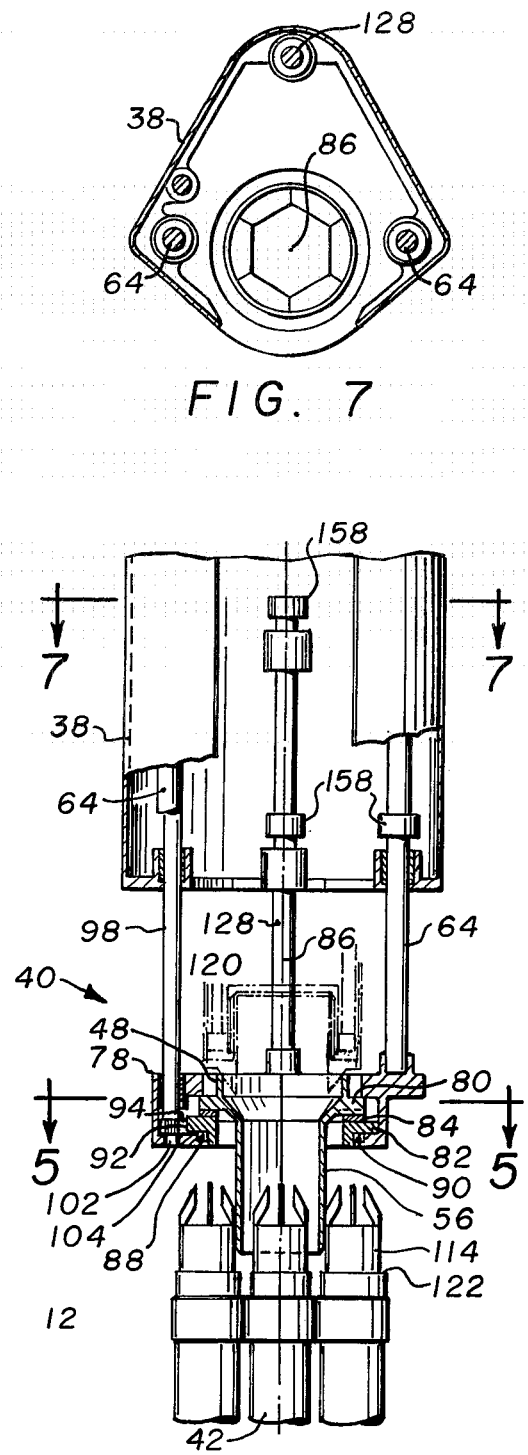
FIG. 2
FIG. 7
FIG. 4

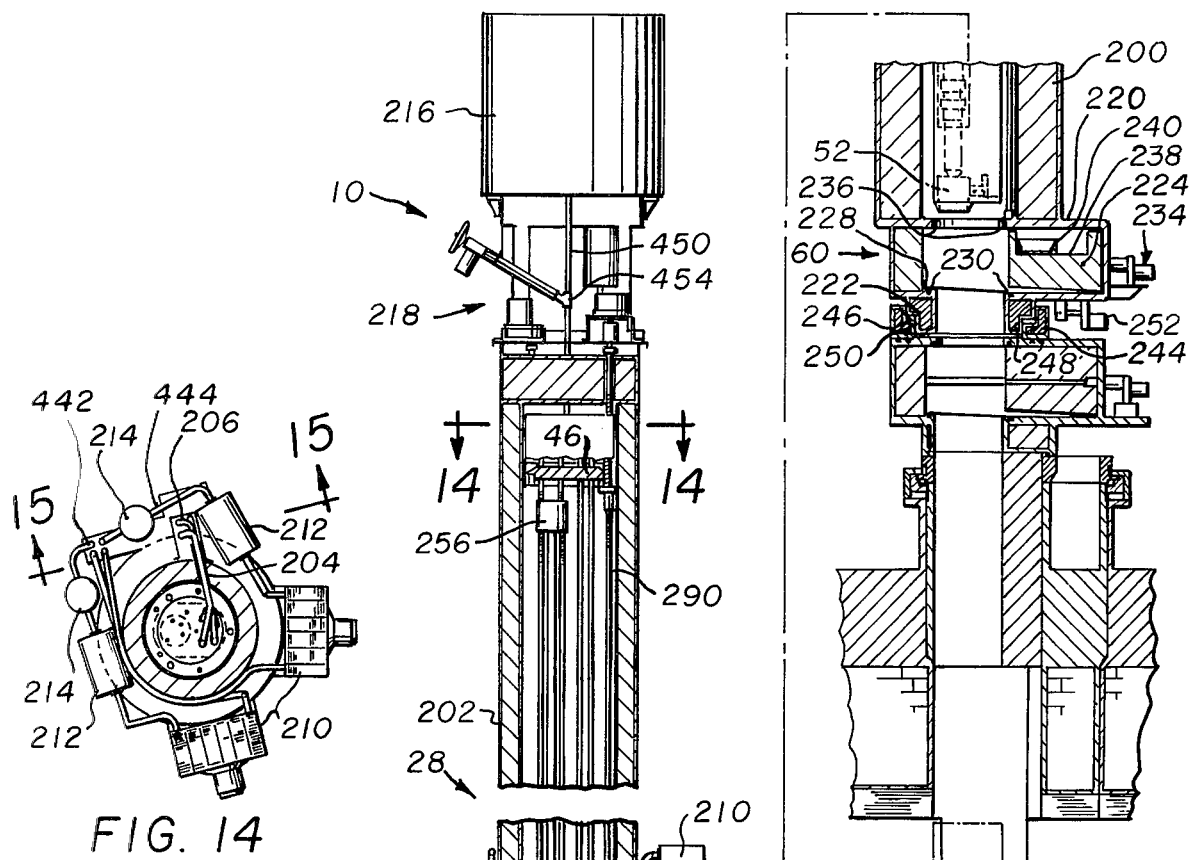
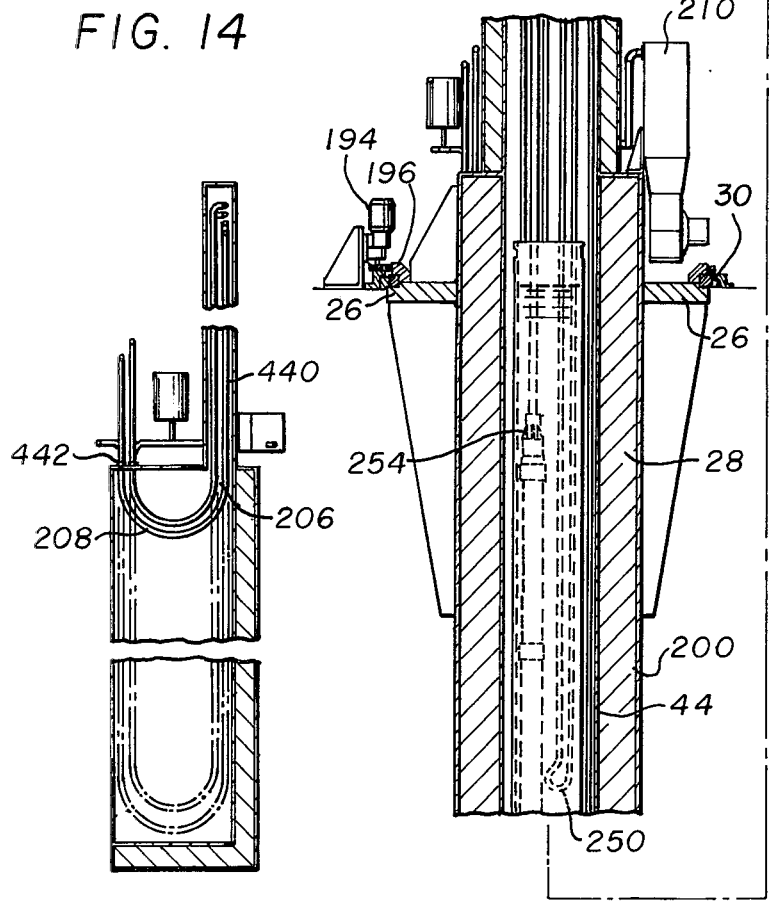
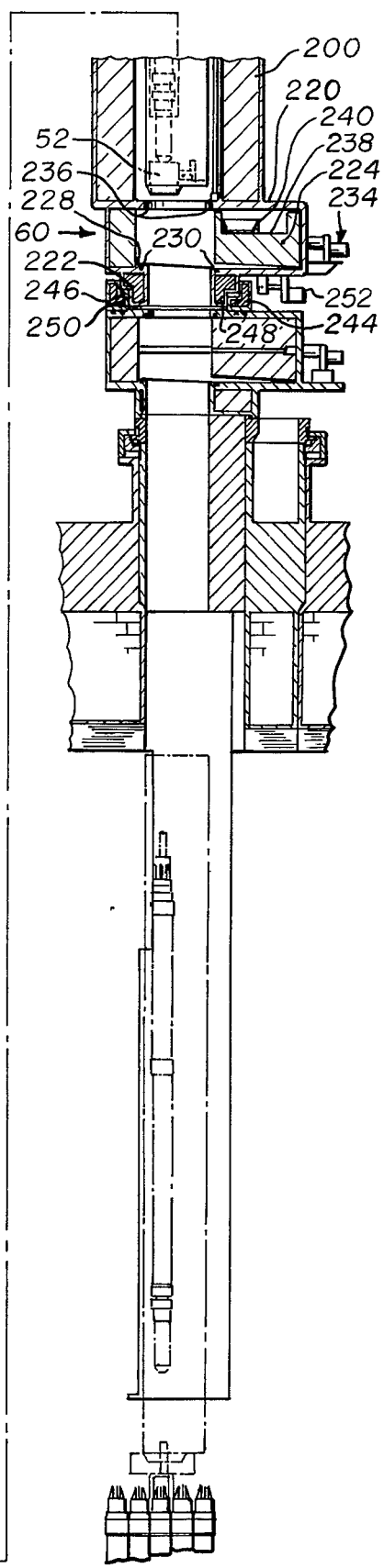
FIG. 14
FIG. 15
FIG. 13

3,948,723

DEVICE FOR FACILITATING THE INSERTION AND WITHDRAWAL OF FUEL ASSEMBLIES FROM A NUCLEAR REACTOR

BACKGROUND OF THE INVENTION

1. Field of the Invention

This invention relates generally to liquid metal cooled nuclear reactors, particularly to equipment for handling nuclear fuel assemblies, and more particularly to an apparatus for isolating a particular reactor core position for easy insertion and withdrawal of fuel assemblies at that position.

2. Description of the Prior Art

In any nuclear reaction which is intended to operate over an extended period of time, such as a reactor which is to be utilized for the generation of electrical power, the reactor facility should be constructed for removal and disposal of used or "spent" fuel elements and for recharging or refueling of the reactor with new or unused fuel elements.

One particular problem which has been encountered with sodium-cooled fast reactors has been accurately locating the fuel subassembly to be removed.

This problem comes about because of the relatively small size of the typical fuel assembly and the tight packing of these assemblies within the core region. It is further compounded by the fact that sodium is not transparent and thus the assemblies cannot be visually located.

Another problem brought about by the tight packing of the fuel assemblies in the core is that of preventing the accidental withdrawal of adjacent assemblies when a desired assembly is being pulled from the core. Also, again due to the tight packing it is desirable to have some means for maintaining the core positions, from which an assembly has been withdrawn, open to facilitate the inserting of a new assembly in its place.

SUMMARY OF THE INVENTION

The present invention overcomes the prior art problems recited above by providing a device which is installed through the reactor closure head prior to refueling. The apparatus includes two separate sections, the handling plug/spreader assembly and the floor valve.

The handling plug is a wedge shaped segment with an opening through it to permit passage of the refueling apparatus. During installation in the reactor the opening is closed by a shield plug, which is removed after the floor valve is installed. The handling plug with the spreader assembly attached replaces an identically shaped control rod island in a rotating plug in the reactor head. The handling plug when in place in the reactor serves as part of the reactor containment boundary to prevent contamination of the reactor room atmosphere during installation of the floor valve.

The core spreader assembly consists of an elongated shroud attached to and extending downward from the handling plug and carrying at its lower end a radially floating, hexagonal spreader or camming tube. The attachment of the camming tube to the shroud is a self-adjusting universal type coupling that permits the tube to move radially to compensate for misalignment as the tube is inserted into the core. Mechanisms are provided to rotate the camming tube for angular alignment purposes and to translate it linearly for insertion into and withdrawal from the core. The upper end of the camming tube serves as a guide for leading the handling machine into alignment with the chosen subassembly.

The floor valve sits on top of the handling plug and interconnects it with the fuel handling machine. It is basically a gate valve provided with shielding to protect operating personnel during handling of spent subassemblies.

BRIEF DESCRIPTION OF THE DRAWINGS

FIG. 2 is an enlarged view showing details of the handling plug/spreader assembly and the floor valve installed in the reactor;

FIG. 4 is an enlarged view of the spreader assembly;

FIG. 7 is a sectional view taken along the line 7—7 of FIG. 4;

FIG. 13 is a sectional elevation view of the spent fuel handling machine;

FIG. 14 is a sectional view taken along the line 14—14 of FIG. 13;

FIG. 15 is a sectional view taken along the line 15—15 of FIG. 14;

DESCRIPTION OF THE PREFERRED EMBODIMENT

In order to facilitate understanding of the structure and utility of this invention it will be described in conjunction with one specific spent fuel handling machine with which it may be used. This fuel handling machine is the subject of a separate patent application, "Nuclear Fuel Handling Apparatus and Method" of C. Andrea, R. C. Noyes, and C. F. G. Dupen filed on even date with this application. It should be appreciated that the apparatus of the present invention may be used to facilitate removal and insertion of fuel assemblies from reactor cores with virtually any type of fuel handling apparatus which has the capability of reaching into the reactor through an access port in the reactor closure head.

General Arrangement of Refueling Apparatus

Figure 1:
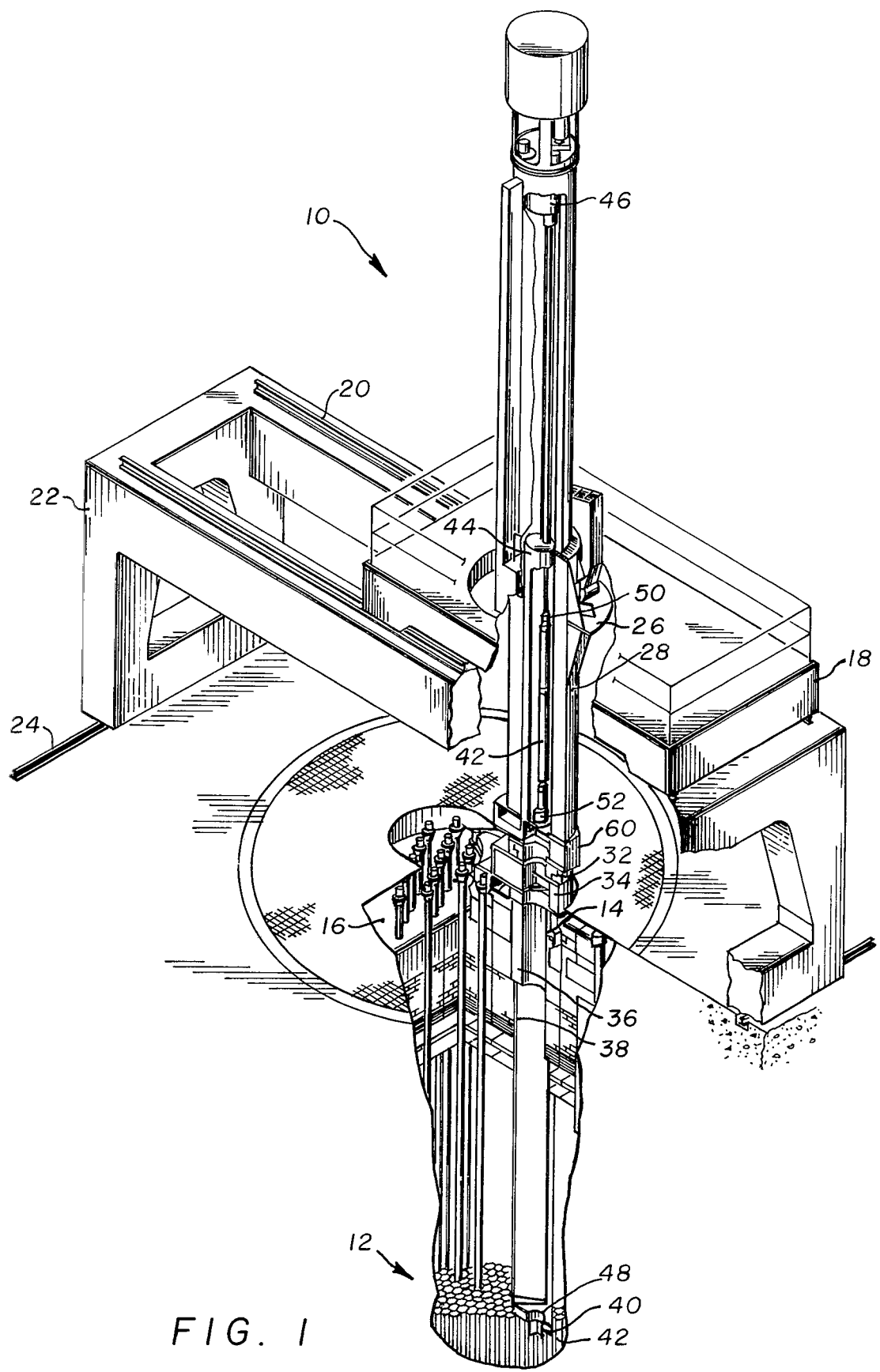
FIG. 1 is an isometric view showing the handling plug/spreader assembly and spent fuel handling machine in operative engagement with the nuclear reactor.

Referring to FIG. 1, spent fuel handling machine 19 is shown positioned above the reactor core 12 and coupled to an access port 14 in the reactor closure head 16. The handling machine is supported in this position by the trolley 18 which is mounted for linear translation on tracks 20 provided on the gantry 22 which in turn is mounted on suitably supported tracks 24 for motion in a direction perpendicular to the trolley.

The attachment of the handling machine 10 to the trolley 18 is accomplished through a mounting ring 26 which is integrally attached to the outer barrel 28 of the handling machine and which is received in a circular bearing 30 (see FIG. 13) carried by the trolley so that the entire handling machine may be rotated about its longitudinal axis. The lower end of the handling machine includes a shield skirt 32 which sealingly engages a floor valve 34 which rests upon and seals with the upper surface of a handling plug 36. The handling plug 36 is contained within the reactor access port 14 and has extending downwardly therefrom a hollow structural shroud 38 which has attached to its lower end a radially floating spreader assembly 40 for engagement with the upper end of one of the subassemblies 42 which make up the reactor core. When inserted into the core the spreader isolates the desired fuel subassembly to permit easy withdrawal of the subassembly from the core.

The handling machine outer barrel 28 contains therewithin a fuel subassembly handling tube 44 which is mounted through the handling tube carriage 46 for vertical displacement downwardly through the access port 14 to the interior of the reactor where it is brought into alignment with the selected subassembly by engaging the upper end 48 of the spreader assembly 40. A gripper assembly 50 mounted for vertical motion with respect to the handling tube carriage 46 is then lowered downwardly through an open closure valve 52 at the end of the handling tube where it engages the upper end of the selected fuel subassembly. The gripper with the fuel subassembly attached is then raised into the handling tube 44, the closure valve 52 closed and the entire subassembly raised up into the outer barrel 28. The lower end of the outer barrel includes an isolation valve 60 which is closed upon withdrawal of the handling tube from the reactor into the barrel so that the handling machine may be transported by use of the gantry 22 and trolley 18 to a remotely located decay tank (not shown).

Handling Plug/Spreader Assembly

The handling plug/spreader assembly, shown in detail in FIG. 2, is designed to facilitate the insertion and removal of fuel subassemblies into and from the reactor core. The core spreader includes a camming tube 56 which is capable of locating a given core position and guiding the fuel handling machine handling tube into alignment with that position.

Referring still to FIG. 2, the handling plug/spreader assembly 54 consists of three subassemblies: the floor valve 34; the handling plug 36; and the core spreader assembly 40.

Figure 3:
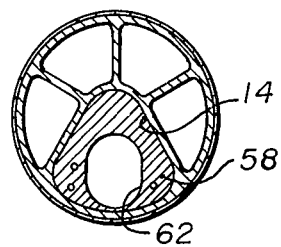
FIG. 3 is a section view taken along the line 3—3 of FIG. 2.

Looking now at FIG. 3, the handling plug 58 is a wedge shaped section shaped to fit into an access port 14 in the top of the reactor closure head. In a typical arrangement the access port 14 may be the opening left in the closure head of a reactor when a similarly shaped control rod island is removed. The rotating plug may be part of a double eccentric rotating plug system for positioning the reactor access port over the various core positions. Such double rotating plug arrangements are well known in the art as exemplified by the arrangement shown in U.S. Pat. No. 3,054,741, entitled "Nuclear Reactor Control Assemblies" by Tatlock et al. The insertion of the handling plug/spreader assembly into the reactor will be more fully described in connection with the description of the operation of the refueling machine.

Figure 10:
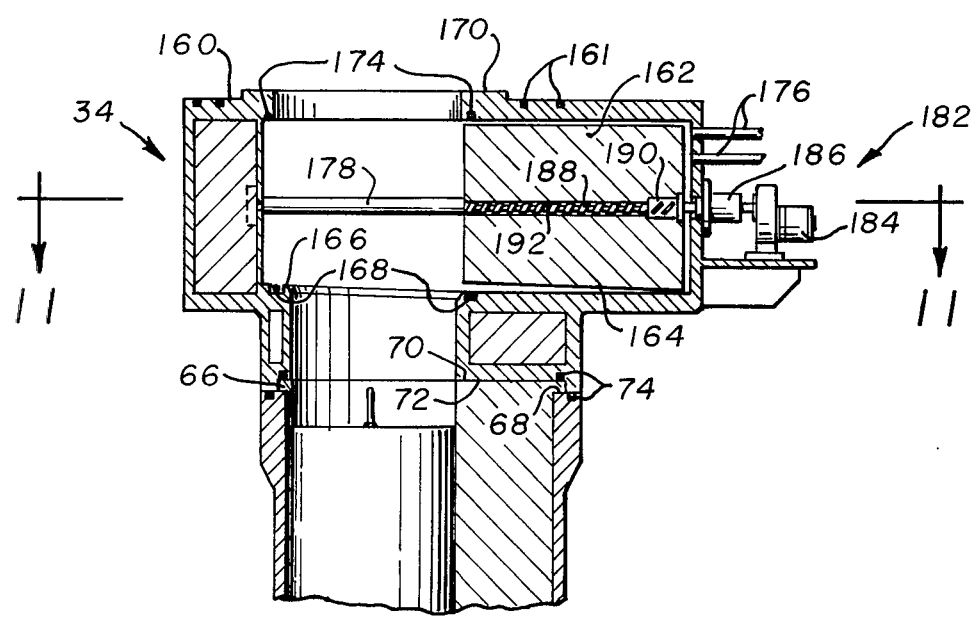
FIG. 10 is a sectional elevation view of the floor valve installed on the handling plug.

An obround opening 62 in the handling plug 58 is provided to permit passage therethrough of the handling tube from the fuel handling machine. An elongated structural tube or shroud 38 is attached to and suspended from the bottom of the handling plug 58 and extends downwardly therefrom to support the core spreader 40 through two ball screws 64. Referring to FIG. 10 the handling plug 36 is supported, and its penetration into the access port 14 limited, by the engagement of a flange 66 at the upper end of the plug with the upper face 68 of the rotating plug. The upper face 70 of the handling plug mates with the lower surface 72 of the floor valve 34 and a gas-tight seal is effected therebetween by a double O-ring sealing arrangement 74. FIG. 2 shows an elongated shield plug 76 inserted within the obround opening 62 in the handling plug 36. This plug 76 serves as a temporary shield before the installation of the floor valve 34 and is removable remotely after the floor valve is secured in position.

Figure 6:
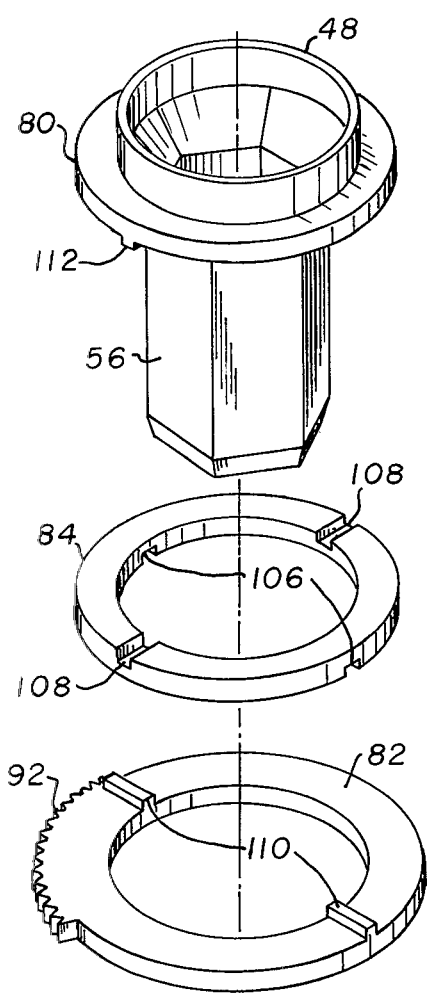
FIG. 6 is an exploded isometric view of the spreader coupling.

Referring to FIG. 4, the core spreader assembly 40 is shown in detail in engagement with the reactor core 12 so as to isolate a typical fuel assembly 42 to facilitate removal of the assembly from the core. The spreader assembly includes the hexagonal camming tube 56 which is mounted within the spreader housing 78 in a manner to permit limited radial movement of the tube with respect to the housing. The mounting of the camming tube 56, which is essentially an inverted Oldham coupling, is comprised of three plates: the upper plate 80, which is a radial extension of the camming tube; the base plate 82; and the key plate 84, which acts as the connecting link between the upper plate and the base plate. These plates are shown in detail in FIG. 6, and their interrelationship will be described in more detail below.

Figure 5:
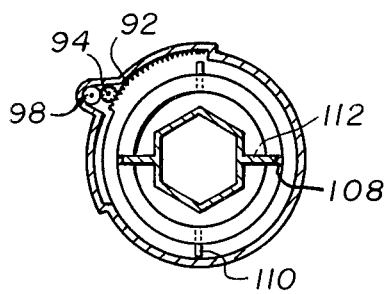
FIG. 5 is a sectional view of the spreader coupling taken along the line 5—5 of FIG. 4.

Referring back to FIG. 4, the base plate 82 is mounted for rotational motion about the centerline 86 of the spreader assembly 40 through a bearing 88 which is supported by the lower end 90 of the spreader housing. A segment of the outer periphery of the base plate contains gear teeth 92 which are adapted to engage mating teeth provided on a pinion 94 (see FIG. 5). The pinion 94 is driven by gear teeth on the angular alignment shaft 98 which extends upward through the elongated shroud 38 and engages a suitable rotational drive arrangement 100 carried by the floor valve 34 (see FIG. 11). The lower end 102 of the angular alignment shaft is supported in a bushing 104 carried by the spreader housing 78. Rotation of the angular alignment shaft 98 causes the base plate 82 to rotate through a maximum angle of 60°. Such a degree of rotation permits the hexagonal camming tube 56, which rotates with the base plate, to be angularly aligned with a selected hexagonal fuel subassembly at any core location.

Referring again to FIG. 6, the key plate 84 is annular in shape and contains two sets of keyways, on opposite sides of the plate and rotated 90° from one another. The first set of keyways 106 is on the lower side of the plate and is engaged by keys 110 formed integrally with the base plate and extending upwardly therefrom. The key plate 84 is thus permitted a small degree of motion along the longitudinal axis of the keyways 106. The upper plate 80 of the camming tube 56 is in turn supported on the upper surface of the key plate. Key extensions 112 of the upper plate 80 engage the second set of keyways 108 and permit limited motion of the camming tube 56 along the second key axis. The above described arrangement permits the camming tube 56 to freely seek and isolate the desired core position without causing undesirable bending stresses in the shroud 38 and other spreader support structure. The interaction of the camming tube 56 with the core will be described with reference to FIGS. 4, 8, and 9. FIG. 4 shows the tube in its desired final position with respect to the core position into which a subassembly is to be removed or inserted. The hexagonal camming tube 56 is in contact with each of the fuel subassemblies 114 adjacent to the core position of interest and, because the internal dimensions of the camming tube 56 are larger than the outer dimensions of the fuel subassembly 42, there exists an all-around clearance 120 between the inside of the camming tube and the selected fuel subassembly. This clearance 120 permits unrestricted insertion and withdrawal of subassemblies from the core position. Referring still to FIG. 4, each fuel subassembly (42, 114) is provided with an upward facing shoulder 122. In the event that an adjacent fuel subassembly is caused to move upward when a particular subassembly is being withdrawn, the upward movement will be limited to a short distance by the engagement of the shoulder 122 with the end of the camming tube 56.

Figure 8:
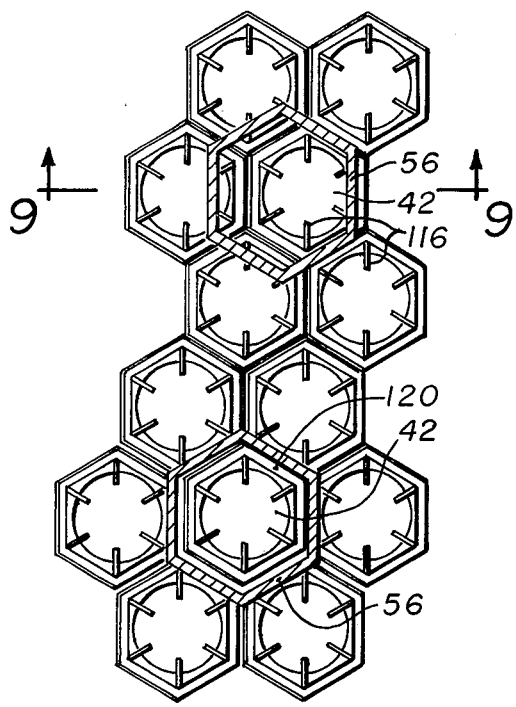
FIG. 8 is a plan view of a reactor core and has an upper and lower portion showing two camming tubes in different positions with respect to selected fuel subassemblies.
Figure 9:
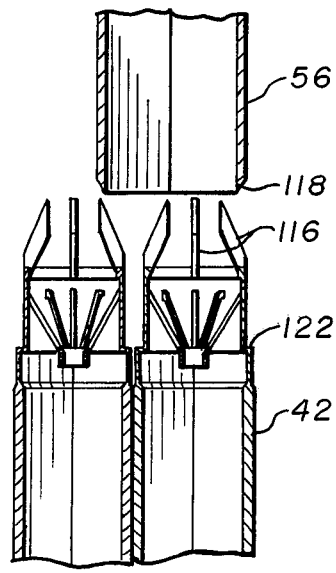
FIG. 9 is a sectional view taken along the line 9—9 of FIG. 8.

Turning now to FIGS. 8 and 9, the interaction of the camming tube 56 with the core, as the camming tube is being inserted into the core, will be described. FIG. 9 and the upper portion of FIG. 8 show a camming tube 56 substantially misaligned from the subassembly 42 to be removed. As best shown in FIG. 9, each of the fuel assemblies 42 includes six symmetrically arranged, inwardly inclined tabs 116 at their upper ends. The symmetrical arrangement of these tabs 116 co-act to form a camming surface which when engaged by the camming tube 56 cause the tube to move into axial alignment with the selected subassembly. The lower end 118 of the camming tube is chamfered on the outside edge to further facilitate guidance of the camming tube into alignment with the selected fuel subassembly. As the tube 56 is lowered toward the subassembly the chamfered lower edge 118 of the tube engages the inwardly extending tabs 116 of several adjacent subassemblies. As a result, as the tube is lowered into the core it is caused to move laterally to become axially aligned with the fuel subassembly and to assure the fully engaged position as shown in the lower portion of FIG. 8.

As was pointed out above, the core spreader 40 is attached to an elongated shroud 38 by means of two ball screws 64. Referring to FIG. 4, these ball screws are attached to the spreader housing 78 and extend upwardly through the shroud 38 where they are suitably supported by a series of bosses 124 on the inside of the shroud through which the ball screws 64 are journaled. Referring to FIG. 7, it is seen that the two ball screws 64 are disposed symmetrically on either side of the spreader longitudinal axis 86. A third rod or rail 128 is provided to act as a guide only and extends only partially into the shroud.

Figure 12:
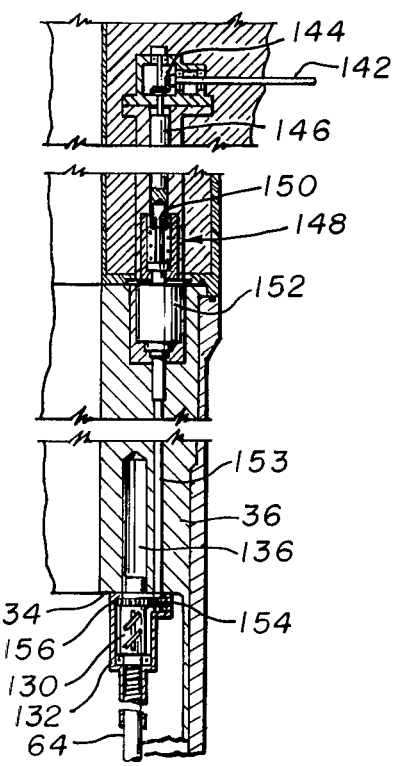
FIG. 12 is a sectional view taken along the line 12—12 of FIG. 11.

Turning now to FIG. 12, the upper end of each of the ball screws 64 engages a ball nut 130 which is enclosed in a protective sleeve 132 attached to the lower face 134 of the handling plug 36. This sleeve 132 permits controlled rotation of the nut 130 within it, while restraining it from axial movement. Rotation of the ball nuts 130 thus imparts axial movement on the ball screw shafts 64. A recess 136 is provided in the handling plug 36 above the ball nut to receive the ball screw shaft 64 when it is in the up position. The ball nuts 130 are driven by two stepping motors 138 mounted on a platform 140 extending from the floor valve (see FIG. 11). The axis of rotation of the motor drive line 142 is changed from horizontal to vertical through a bevel gear set 144 contained within the floor valve 34. The vertical drive line 146 couples to a second vertical line by means of a spline coupling 148 at the interface between the handling plug 36 and the floor valve 34. The spline coupling 148 is comprised of a spring-loaded sliding spline 150 in the floor valve section of the drive line and a splined one-directional, or antirun back device 152 which the sliding spline 150 engages, and which is located in the handling plug 36. The lower end of the handling plug portion of the drive line 153 carries a small gear 154 which engages mating circumferential gear teeth 156 carried by the ball nut 130.

Remote actuation of the motors 138 thus causes the ball screws 130 to move vertically up or down to cause withdrawal or insertion, respectively, of the spreader assembly 40 with respect to the reactor core. The vertical travel of the spreader is limited by hard stops 158 on the lower portion of the ball screw shafts and the third rail 128. These stops 158 provide for sufficient vertical movement to permit full insertion and withdrawal of the spreader clear of the core, while at the same time preventing damage to the spreader and/or core which might result from attempting to force the spreader farther than necessary into the core.

The Floor Valve

Referring to FIG. 10 the floor valve 34 fits over and attaches to the handling plug to complete the handling plug/spreader assembly 54. During refueling the upper surface 160 of the floor valve interfaces with the refueling machine to form a hermetically sealed passage through the handling plug into the reactor. When the valve is closed it provides a barrier of lead shielding for personnel protection. The floor valve 34 is basically a heavily shielded gate valve. The valve disc 162 is tapered on its lower face 164 to mate with a similarly tapered valve seat 166. This protects the O-ring lower sealing element 168 from damage when the disc is moved to close or open the passage. The valve body 170 is otherwise a hermetically sealed unit with connections 176 provided for purging the body of the valve with clean argon.

Figure 11:
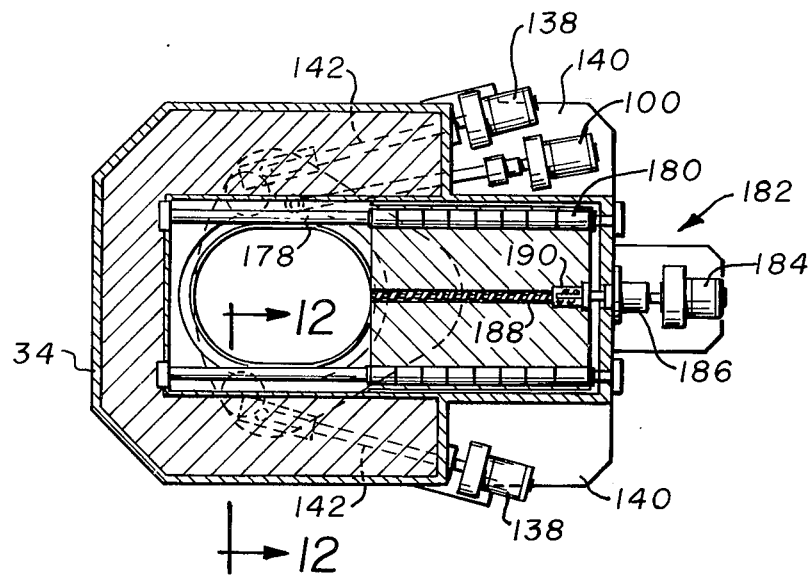
FIG. 11 is a sectional view, showing the floor valve drive and spreader drive mechanism, taken along the line 11—11 of FIG. 10.

Referring to FIGS. 10 and 11 the valve disc 162 is mounted on rails 178 and rides on a series of ball bushings 180. Motive force to operate the valve is provided by a ball screw drive arrangement 182. The drive motor 184 is mounted outside of the valve body 170 and drives, through a one-directional coupling 186, a ball screw shaft 188. The shaft 188 and motor 184 are axially stationary and engage a ball nut 190 attached to the valve disc 162. Upon actuation of the motor 184 is caused to be inserted or retracted, with the ball screw shaft 188 passing into a longitudinal cavity 192 within the disc 162 when the valve is fully open.

Spent Fuel Handling Machine

The spent fuel handling machine 10 is designed to remove spent fuel subassemblies directly from the reactor core 12 to the decay tank (not shown). During this transfer, the spent subassemblies are maintained immersed in liquid sodium within a handling tube. Referring to FIG. 1, the machine 10 is located for movement on X-Y coordinates by moving with the gantry crane 22 and its associated trolley 18. The machine is rotatably mounted to the trolley 18 through a mounting ring 26 and is rotated with respect to the crane and trolley by actuation of a drive motor 194 which engages circumferential gear teeth 196 on the outer periphery of the mounting ring 26 (see FIG. 13).

The handling machine works with the handling plug/spreader assembly to enter the reactor vessel and align itself with the subassembly scheduled for removal. Referring to FIG. 13 the main structural component of the handling machine is a vertically extending shielded cylinder 28 which will be hereinafter referred to as the outer barrel. All systems and components of the handling machine are supported from the outer barrel. The mounting ring 26 through which the machine is supported by the trolley is an integral part of the outer barrel. A large bearing 30 is disposed between the mounting ring and the trolley to facilitate rotation of the machine to bring it into alignment with the access port of the reactor. To cover all core locations the outer barrel drive 194 is provided with a 360° rotation capability which is controlled by a pre-prgrammed control system.

The outer barrel 28 is divided into two regions because of radiation shielding requirements. The lower end 200 is supplied with shielding equivalent to about 13 inches of lead. The upper end 202 is shielded with about 6 inches of lead. Referring to FIGS. 14 and 15, the shielded walls of the outer barrel are bisected by a vertically extending slot 204 connecting an adjacent shielded flexible hose cavity 206 to the interior of the outer barrel. This cavity houses loops of flexible hoses 208 used to bring various service lines from the exterior of the outer barrel 28 to the internal assemblies. Among the services required are NaK lines for cooling loops, an argon line, and instrumentation lines for monitoring and controlling operation of the fuel handling machine. Two NaK-to-air heat exchangers 210 are mounted on the outside of the outer barrel to dum decay heat removed from inside the handling tube into the operating room atmosphere. Other components which are mounted on and supported by the outer barrel include sodium pumps 212 and surge tanks 214 for the two coolant loops, an emergency sodium supply tank 216, and motors and associated drives 218 for the various mechanical manipulators. Each of these components and systems will be subsequently described in greater detail.

Referring to FIG. 13, there are integrally formed with the lower end 200 of the outer barrel an isolation valve housing 220 and a stationary portion 222 of a shield skirt assembly extending down from the isolation valve housing. The isolation valve 60 provides shielding and gas sealing at the bottom of the outer barrel during transport of the machine and also provides sodium containment in the event of sodium leakage from the handling tube 44 contained within the outer barrel 28.

Referring still to FIG. 13, the isolation valve 60 is basically a heavily shielded gate valve virtually identical in design to the floor valve 34. The valve disc 224 is tapered on its lower surface to mate with a similarly tapered valve seat 228. This arrangement minimizes the possibility of damage to the sealing element, which comprises an O-ring 230 embedded in a groove in the valve seat, during operation of the valve. The valve disc 224 is sealed on its upper face by an inflatable seal 236 which seals against the valve disc. The interior of the valve body is, except for the opening covered by the valve disc, hermetically sealed and includes gas connections (not shown) for purging with a clean inert gas such as argon.

The mounting and actuation apparatus 234 of the isolation valve disc 224 is identical to that for the floor valve 34 and will not be described in detail. The upper side of the isolation valve disc is hollowed out 238 to permit placement of a drip pan 240 which is provided to collect small sodium drips from the handling tube 44 contained within the outer barrel 28. The drip pan is designed to serve as a backup to the handling tube closure valve 52. If a leak develops in the valve, the handling tube is lowered into the drip pan 240 which is contoured to provide a plug into which the end of the handling tube 44 can be inserted. This engagement will be understood more fully flowing the complete description of the handling tube and closure valve assemblies.

As pointed out above, the stationary portion 222 of the shield skirt extends downward from the isolation valve body 220. This portion of the skirt comprises an annular ring having essentially an inverted L-shaped cross section. The movable portion of the shield skirt 244 comprises a movable ring section mating with and guided by the stationary section. The movable section has an L-shaped cross section and mates with the stationary section at two surfaces 246, 248. Double O-ring type seals are provided at each of these mating surfaces. Vertical motion of the movable section is caused by a series of four ball screws supported from the stationary section and driven by a drive motor 252 attached to the isolation valve housing 220. Details of the drive system are not shown in the drawing. In operation, the handling machine 10 is positioned just above the floor valve 34 of the spreader assembly and the shield skirt lower section 244 is actuated to move downwardly to form a seal with the floor valve 34 through double O-rings 161 (see FIG. 10) in the upper surface of the floor valve.

INTERNAL ASSEMBLIES

The internal assemblies include all mechanisms and components contained within the shielded outer barrel. Among these, generally, are the handling tube 44, the handling tube carriage 46, the gripper 254 and gripper carriage 256 and the drive mechanisms.

Figure 17:
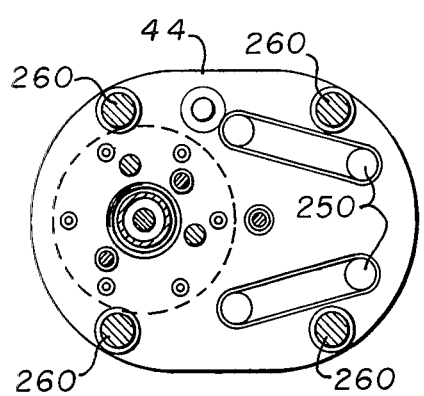
FIG. 17 is a plan view of the handling tube assembly.
Figure 16:
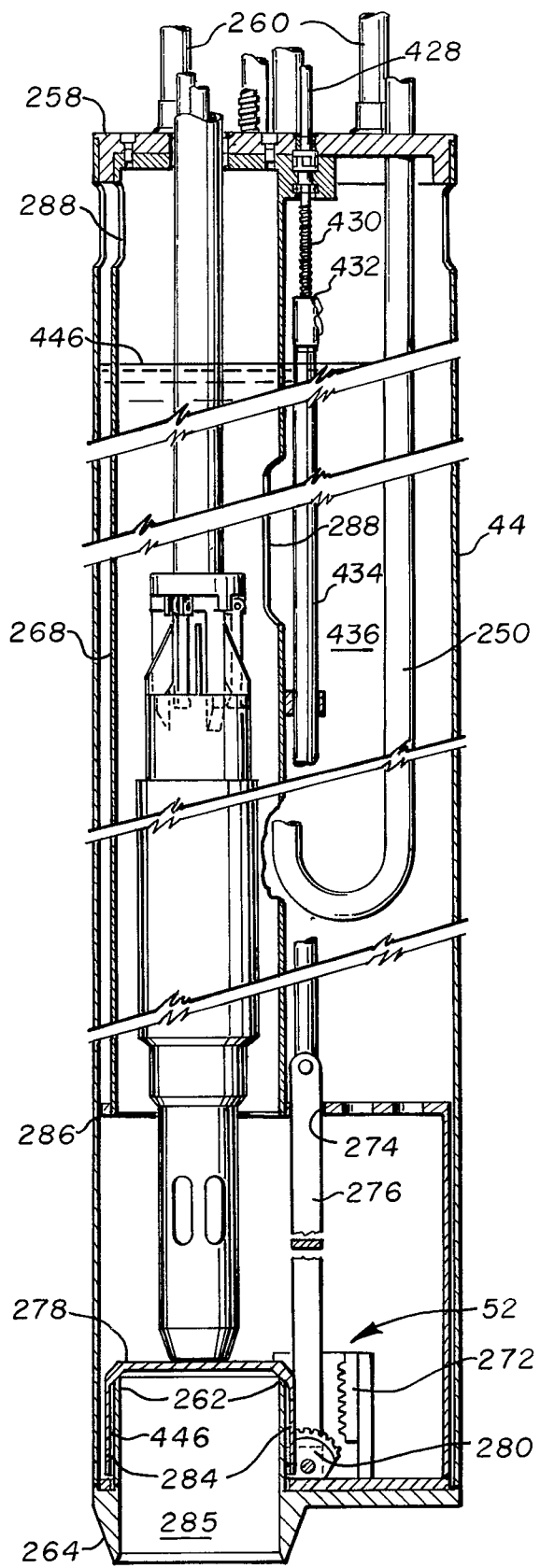
FIG. 16 is a sectional elevation view of the handling tube assembly.

The handling tube assembly is shown in FIG. 13 in its at rest position within the outer barrel, and in more detail in FIGS. 16 and 17.

The handling tube 44 is an elongated obround vessel designed to accommodate a spent fuel subassembly; it further includes cooling coils 250 to remove decay heat given up by the subassembly, and a closure valve assembly 52 to contain liquid sodium within the tube. The handling tube is supported at its upper end by the handling tube support plate 258, which in turn is supported, from above, through four columns 260 attached to the handling tube carriage assembly 46, which will subsequently be described in considerable detail. The lower end of the handling tube contains the closure valve seat 262 and an alignment nozzle 264. The alignment nozzle is tapered inwardly on its outer edge and is sized to facilitate engagement with the upper end 48 of the upper plate/camming tube component of the spreader assembly 40 when the handling tube 44 is lowered into the reactor core.

Inside the handling tube and also suspended from the handling tube support plate 258 is the parking tube assembly 268. The parking tube 268 has attached to its lower end the necessary structure to guide and operate the closure valve disc 278 and mechanism. This structure includes a pair of spaced vertically extending gear racks 272 and suitable journal type guide means 274 for the valve actuator shaft 276. The closure valve disc is supported by a yoke 280 having a geared sector which engages the rack 22 and is restrained and guided in its travel by the gear rack and guides mounted on the parking tube. The valve disc 278 is operated by a ball screw shaft 282 which attaches to the valve actuator 276 and in turn to the yoke 280. When the ball screw shaft is drawn upward the valve disc, which includes an integrally formed downwardly extending skirt portion 284, is raised slightly upwardly to provide clearance and is then caused to swing laterally out of the way of the passage-way 285 into the handling tube 44. The valve 278 is shown in its open position in FIGS. 27c and d of the series of figures showing the operating sequence of the present invention. The details of construction and operation of the closure valve are more specifically shown and described in a copending application entitled "Anti-Leak Closure Valve" of C. Andrea filed on even data and assigned to the same assignee as the present invention.

Referring back to FIG. 16, the parking tube proper begins at a position 286 above the valve seat 262 sufficient to permit unobstructed operation of the valve and extends up to and is attached to the handling tube support plate 258. The upper end of the parking tube is supplied with flow holes 288 to permit free circulation of liquid sodium heated in the parking tube by spent fuel decay heat generation.

Handling Tube Assembly

As was indicated the handling tube assembly is supported from above by four columns 260 attached to the handling tube carriage assembly 46. The handling tube carriage in turn is mounted on three ball screws 290 (only one of which is shown in FIG. 13) which extend the full length of the outer barrel and which when actuated cause the entire handling tube assembly to translate vertically within the outer barrel 28. The full range of travel of the handling tube 44 is illustrated by reference to FIGS. 27a and 27c where it is shown in fully withdrawn and fully inserted positions, respectively.

Figure 20:
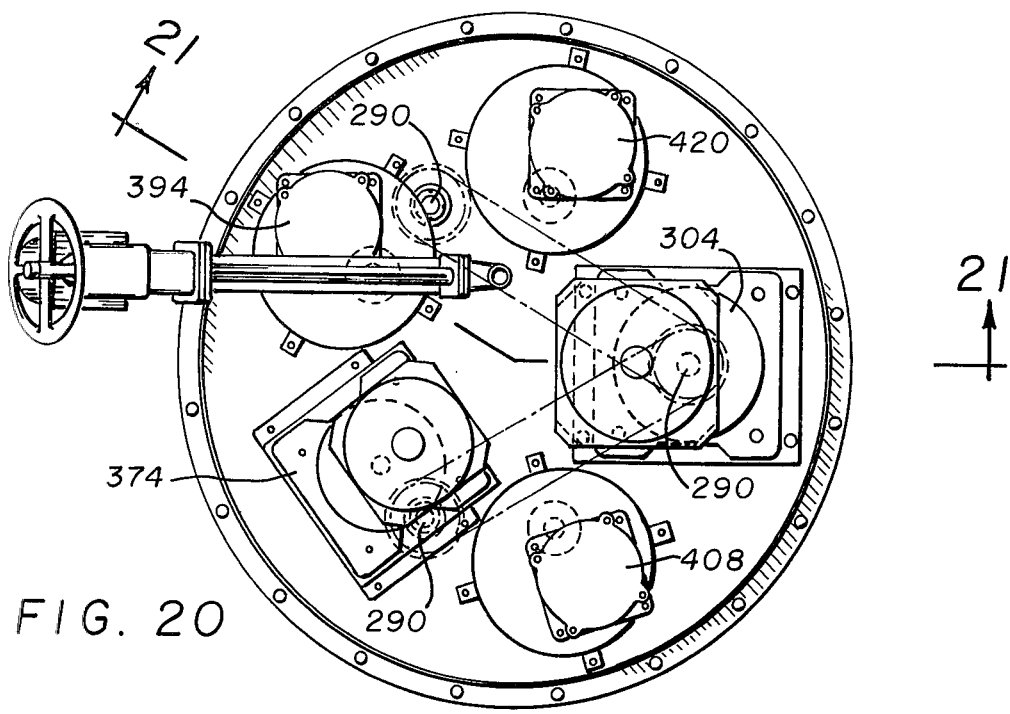
FIG. 20 is a plan view of the drive mechanism area atop the fuel handling machine.
Figure 21:
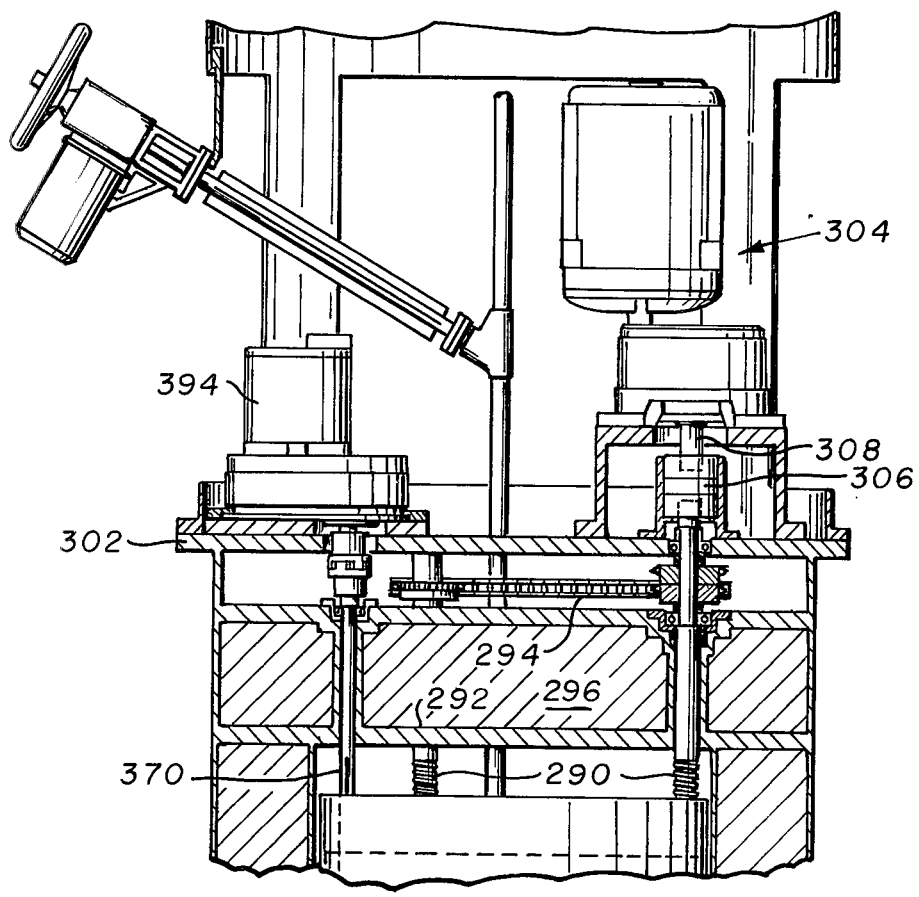
FIG. 21 is a sectional view taken along the line 21—21 of FIG. 20.
Figure 22:
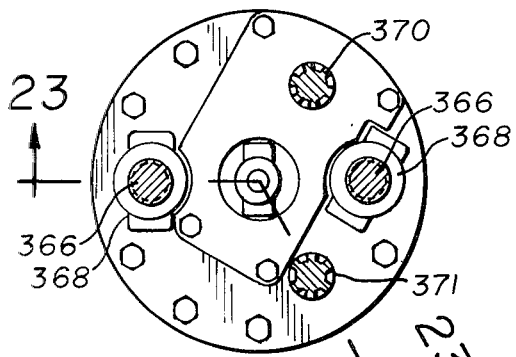
FIG. 22 is a plan view of the gripper carriage assembly.
Figure 24:
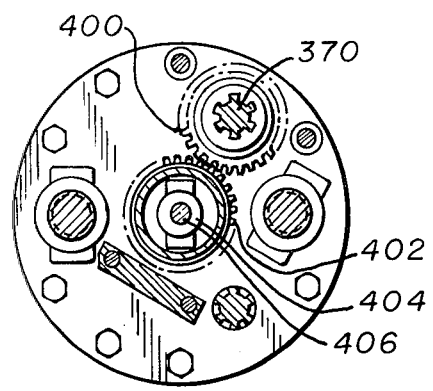
FIG. 24 is a sectional view taken along the line 24—24 of FIG. 23.
Figure 25:
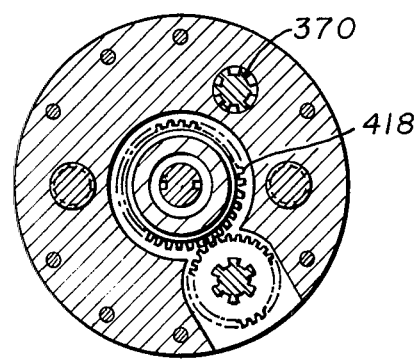
FIG. 25 is a sectional view taken along the line 25—25 of FIG. 23.

Referring to FIGS. 20 and 21 it is seen that the three ball screws are equally spaced about the carriage and pass through the top 292 of the outer barrel where they engage with a chain drive mechanism 294 which is contained within a disc-shaped compartment 296 positioned above the top of the barrel. The top of this compartment forms a drive mechanism platform 302 which carries the motor gear reducer set 304 which drives the chain drive mechanism 294. An anti-runback device 306 is provided between the gear box output shaft 308 and the ball screw drives 294 to assure that the handling tube carriage 46 will not run down due to gravity in the event of a loss of electrical power.

Figure 18:
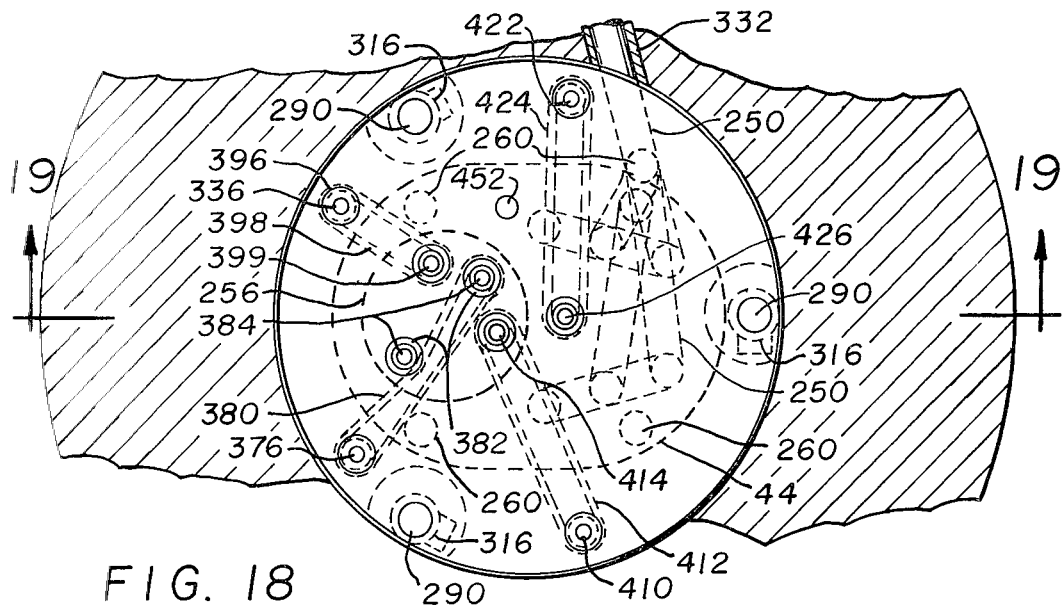
FIG. 18 is a plan view of the gripper carriage assembly.
Figure 19:
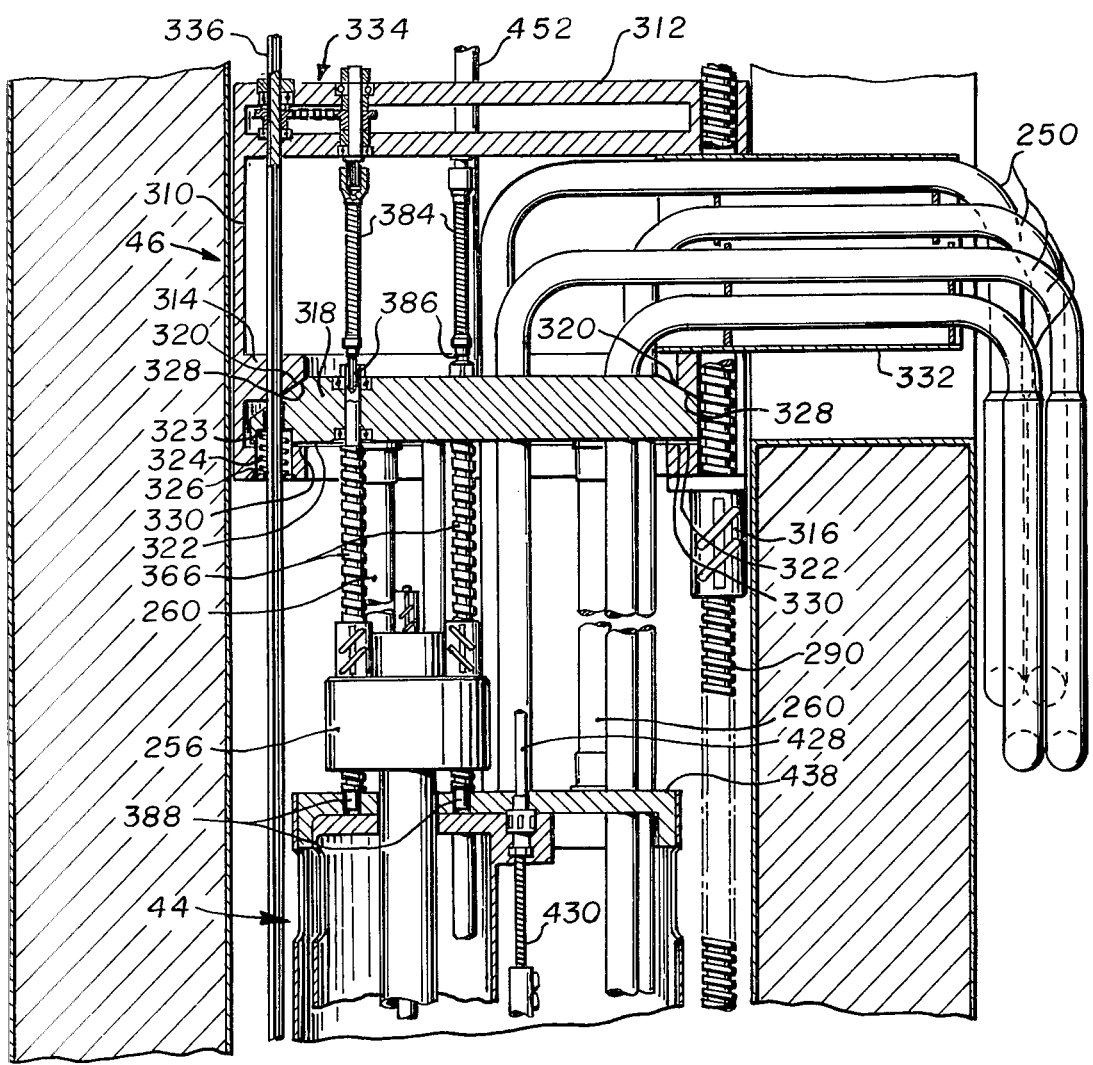
FIG. 19 is a section taken along the line 19—19 of FIG. 18, certain liberties have been taken with this Figure for the purpose of facilitating description of the invention, as is explained in the specification which follows.

Referring to FIGS. 18 and 19, the handling tube carriage 46 is comprised of two major components; the outer portion 310 which includes the chain drive support plate 312 and the swivel cage 314 to which the three ball screw nuts 316 which engage the handling tube ball screws 290 are attached; and the swivel plate 318 which is contained by the swivel cage 314 and to which the four columns 260 which support the handling tube assembly 44 are rigidly attached. While the carriage assembly 46 and handling tube assembly 44 are shown in close proximity in FIG. 19 for convenience of illustration, it should be appreciated that the handling tube support columns 260 are quite long, in order to allow engagement of the handling tube 44 with the reactor core when the carriage 46 is in its full down position.

Referring still to FIG. 19, the swivel plate 318 is essentially disc shaped and has a spherical surface 320 on its upper edge. The lower surface 322 of the swivel plate is flat and the plate is supported through a series of die springs 324 disposed between recesses 323 in the bottom of the plate and the base plate 326 of the swivel cage. These springs 324 are sized to life the swivel plate 318 and handling tube assembly 44 without a spent subassembly inside, from the flat lower surface 322 and to urge the spherical surface 320 into engagement with a mating spherical surface 328 on the upper portion of the cage. The clearance 330 between the lower surface 322 of the plate and the base plate 326 is sufficient to permit a swiveling motion of the swivel plate 318/handling tube 44 assembly with respect to the rest of the carriage 46. This freedom of motion permits the handling tube 44 to accommodate a limited amount of misalignment from the theoretical centerline as it is lowered down through the outer barrel 28 into the reactor and into engagement with the spreader assembly 40. When a spent fuel subassembly is held in the handling tube the weight is sufficient to overcome the upward force of the die springs 324 and causes the swivel plate 318 to seat on the flat surface 322, thus assuring perpendicularity of the tube 44 as it is withdrawn from the core back into the outer barrel 28.

The upper section of the handling tube carriage 46 is attached rigidly to the cage section 314 and provides support for the offset arm 332 which provides support and guidance for the coolant lines 250 and other services such as gas lines which must pass from the flexible hose cavity 206 to service the handling tube assembly.

The upper section of the carriage also serves as a support structure 312 for chain drive power take-offs 334 from the primary splines for the gripper actuation and manipulation of which this shaft identified as 370 s typical. These drive arrangements will be fully described below in connection with the description of the gripper system.

Gripper System

Figure 27A:
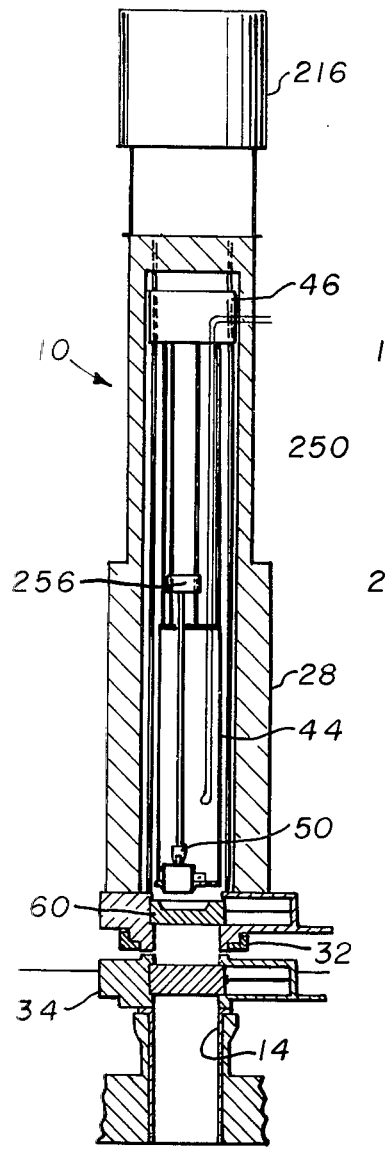
FIGS. 27a-f are a series of views showing the sequential operation of the fuel handling machine.

The gripper system is comprised of two major subassemblies, the gripper assembly itself 50 and the gripper carriage 256; the relative position of these subassemblies is simply shown in FIG. 27a.

Figure 23:
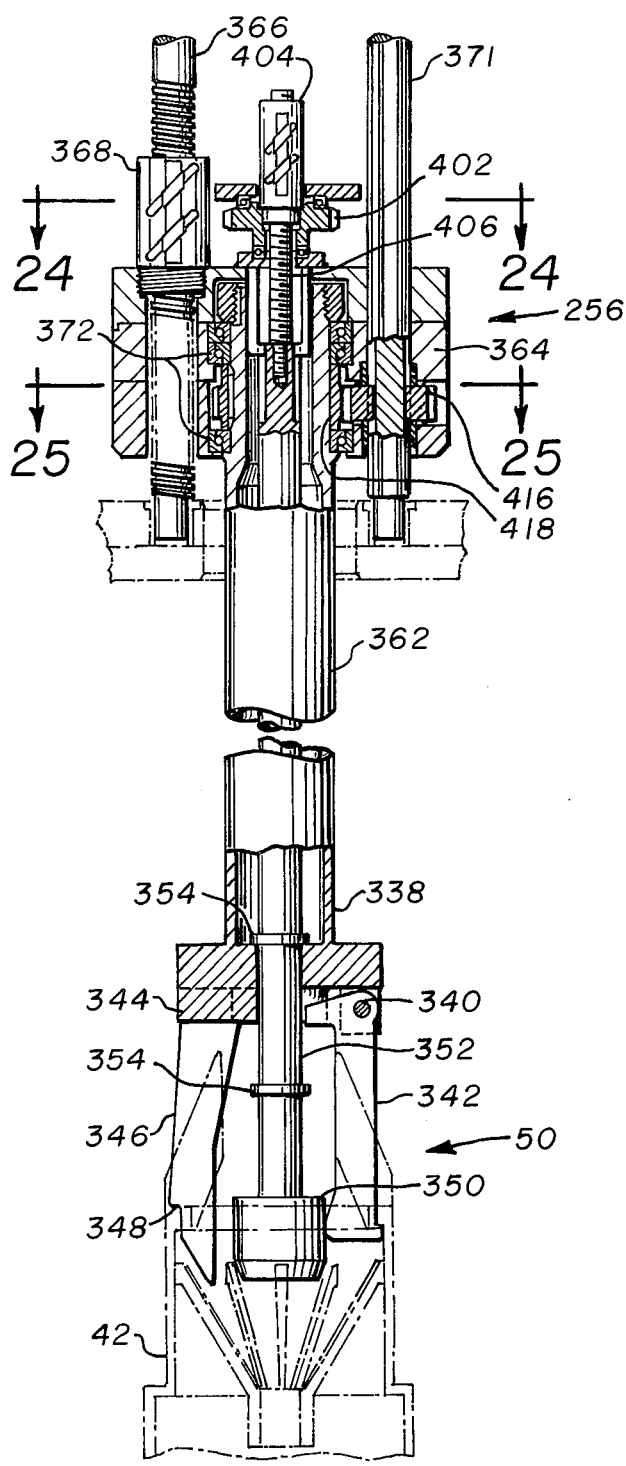
FIG. 23 is a sectional view taken along the line 23—23 of FIG. 22.

Referring to FIG. 23, the gripper assembly consists of the body 338 to which are mounted, through pinned connections 340 three gripper fingers 342. The fixed part of the gripper is referred to as the pedestal 344 and comprises three downwardly extending projections 346 which engage the upper end of a fuel assembly 42, as at 348, to provide the proper orientation between the gripper and the subassembly. The gripper actuator includes an enlarged plunger 350 attached to an actuator rod 352. The actuator rod 352 is actuable in a vertical direction and is stop-limited through stops 354 for proper positioning. When the actuator rod 352 is in the down position (as shown in FIG. 23), the gripper actuator plunger 350 holds the gripper fingers 342 in the engaged position with the extension on the lower outer portion 356 of the fingers 342 engaging the lower surface 358 of a peripherally extending lip on the subassembly. When the actuator rod 352 is in the full up position, the fingers 342 are caused to swivel inwardly to the disengaged position as the lower stop engages the upper arm 360 of the fingers 342. The gripper actuator is mounted to permit free rotation of the actuator rod 352 to minimize friction forces that must be overcome when the gripper, with a subassembly attached, is rotated for fuel rotation or shuffling to another position in the reactor core. The gripper 50 is suspended from the gripper carriage 256 by the gripper support tube 362. This tube is hollow to minimize weight and to permit passage of the actuator rod 352 therethrough to the gripper carriage.

Referring to FIGS. 22 through 25, the gripper carriage 256 is essentially a machine crosshead 364 and is the focal point for the apparatus for performing all of the gripper manipulations required. The raising and lowering of the gripper carriage is accomplished by two ball screws 366 which engage ball screw nuts 368 mounted on the gripper carriage. Two spline shafts 370, 371 energize drive trains in the carriage, one (370) operating the gripper actuator 352 as previously described, and the other (371) for rotating the gripper.

The gripper support tube 362 is mounted in the gripper carriage crosshead 364 on bearings 372 and is free to rotate in relation to the gripper carriage 256. The gripper rotation drive is capable of placing the gripper 50 in angular alignment with the core for all core positions and is also used for performing subassembly rotation.

Drive Mechanisms

The handling machine 10 requires five independent drive trains for operating the internal mechanisms described above. Drive packages for all five of these drives are located on the platform 302 above the shielded outer barrel 28. These drives are in an argon atmosphere at all times and because they are isolated and shielded from the barrel internal atmosphere permit personnel access to perform maintenance at all times.

Before proceeding with the description of the drive mechanisms a few clarifying comments will be made with regard to FIGS. 18 and 19 of the drawings. FIG. 18, as already indicated, is a plan view of the upper end of the gripper carriage 46 showing the location of all drive shafts and other services which enter the handling tube. The locations of chain drives, the gripper carriage, the handling tube and the coolant lines are also shown in phantom lines.

While FIG. 19 is identified as a section to the view of FIG. 18, certain liberties have been taken in this figure to more clearly illustrate the apparatus. The following modifications have been made in this drawing: The offset arm 332 has been rotated into view along the horizontal section; the gripper actuator spline shaft 370 has also been rotated into view; the gripper carriage 256 and associated drive shafts have been rotated clockwise to bring the two ball screw shafts 366 into alignment with the section line 19—19.

The five drive mechanisms include the handling tube carriage drive, the gripper drive, the gripper actuator drive, the gripper rotation drive and the closure valve drive. The handling tube carriage drive has already been described in connection with the handling tube carriage 46 and as indicated includes the motor gear reducer set 304, an anti-runback device 308, chain drive arrangement 294, and the three ball screws 290.

The gripper drive mechanism provides the motive force to lower and raise the gripper carriage 256. Referring to FIGS. 20 and 21, a motor gear reducer set 374 drives a spline shaft 376, similar to the shaft 336, which extends the full length of the interior of the outer barrel 28. Referring now to FIGS. 18 and 19 again, the shaft identified as 336 is typical of the gripper drive spline shaft and those used in connection with the other similar drive mechanisms. The shaft passes through the swivel plate 318 of the handling tube carriage 46 with sufficient clearance to permit free rotation of the shaft and the necessary swiveling or tilting of the plate. A swivel plate support spring 324 is disposed concentrically about the shaft. The shaft then passes downwardly through the space between the inner wall of the barrel 28 and the outer wall of the handling tube 44.

Still referring to FIGS. 18 and 19, the spline shaft 376 slideably engages a splined chain drive sprocket similar to 378 which is held captive in the chain drive support plate 312 of the handling tube carriage 46. this sprocket, as does 378, rides on the spline shaft, and through a chain 380 drives two other sprockets 382 which are located directly overlying the gripper carriage 256. These sprockets 382 in turn drive a pair of flexible shafts 384 which extend down to the swivel plate 318. At the swivel plate, the flexible shafts 384 engage, through splined connections 386, the gripper drive ball screw shafts 366 which extend down through the gripper carriage 256 and are supported at their lower ends 388 in the top of the handling tube 44. The ball screws 366 engage ball screw nuts 368 which are held captive in the gripper carriage 256. Accordingly, as the ball screws 366 are rotated the gripper carriage 256 translates vertically along the ball screw shafts 366. An anti-runback device similar to that used in the other drives mounted between the upper end of the spline shaft 376 and the gear reducer assures that in the event of a power failure the gripper cannot run down and will maintain its desired position.

The prime mover for the gripper actuator is a low speed stepping motor 394 which drives a spline shaft 336 which extends the length of the interior of the outer barrel, similar to the gripper drive mechanism. A sprocket 396 and chain drive 398 transfer the drive power to a flexible shaft 399 which passes to the swivel plate 312. At the swivel plate the power is transferred to a second spline shaft 370 which runs from the swivel plate 312 to the top of the handling tube 44. Referring now to FIGS. 22 through 25, this spline 370 passes through the gripper carriage 256 where it engages a splined gear 400 which is mounted to the gripper carriage. This gear in turn engages mating teeth on a gear 402 attached to a ball nut 404 which is held axially by an attachment to the gripper carriage. As the ball nut is turned the ball screw 406 which is attached to the actuator drive rod 352 translates to open or close the gripper fingers 342 as previously described.

The gripper rotation drive mechanism includes a motor 408, spline shaft 410, chain drive 412, flexible shaft 414, and second spline shaft 371 arrangement identical to the gripper actuator drive. Referring to FIGS. 22–25, at the gripper carriage 256 the second spline shaft 371 engages a splined gear 416 which in turn engages a gear 418 on the upper end of the gripper support tube 362. The tube 362 is mounted to the carriage through a series of bearings 372 and thus is free to rotate upon actuation of the rotation drive.

Referring again to FIGS. 18 through 20, the closure valve drive mechanism includes a motor gear set 420, spline shaft 422, chain drive 424 and flexible shaft arrangement 426 identical to the gripper actuator drive. At the swivel plate 318 the flexible shaft engages a second drive shaft 428 (see FIGS. 19 and 16) which extends down to the handling tube 44 where it is connected to a ball screw 430 mounted in the upper end of the handling tube. The ball screw 430 engages a ball nut 432 which is attached through connecting rod 434 to the yoke 280 supporting the closure valve disc 278. As the ball screw 430 is rotated the yoke 280 is raised or lowered to open or close the closure valve.

Environmental Control Systems

The systems for controlling the environment in the handling machine are divided into three categories consisting of the decay heat removal systems, the handling tube sodium level system, and the handling machine internal environmental control system.

Decay Heat Removal System

The decay heat removal system includes two subsystems: the primary heat removal system and the secondary cooling system.

The primary heat removal system consists of the handling tube and the parking tube (see FIG. 16). Decay heat given off by spent subassemblies in the parking tube 268 is transferred to the sodium by conduction. Convection currents then cause the heated sodium to rise in the parking tube 268 and pass out through the flow holes 288 to the cooling chamber 436 which is the space between the parking tube 268 and the wall of the handling tube 44. The heated sodium then descends through the cooling chamber where it gives up heat to the secondary cooling system.

Figure 26:
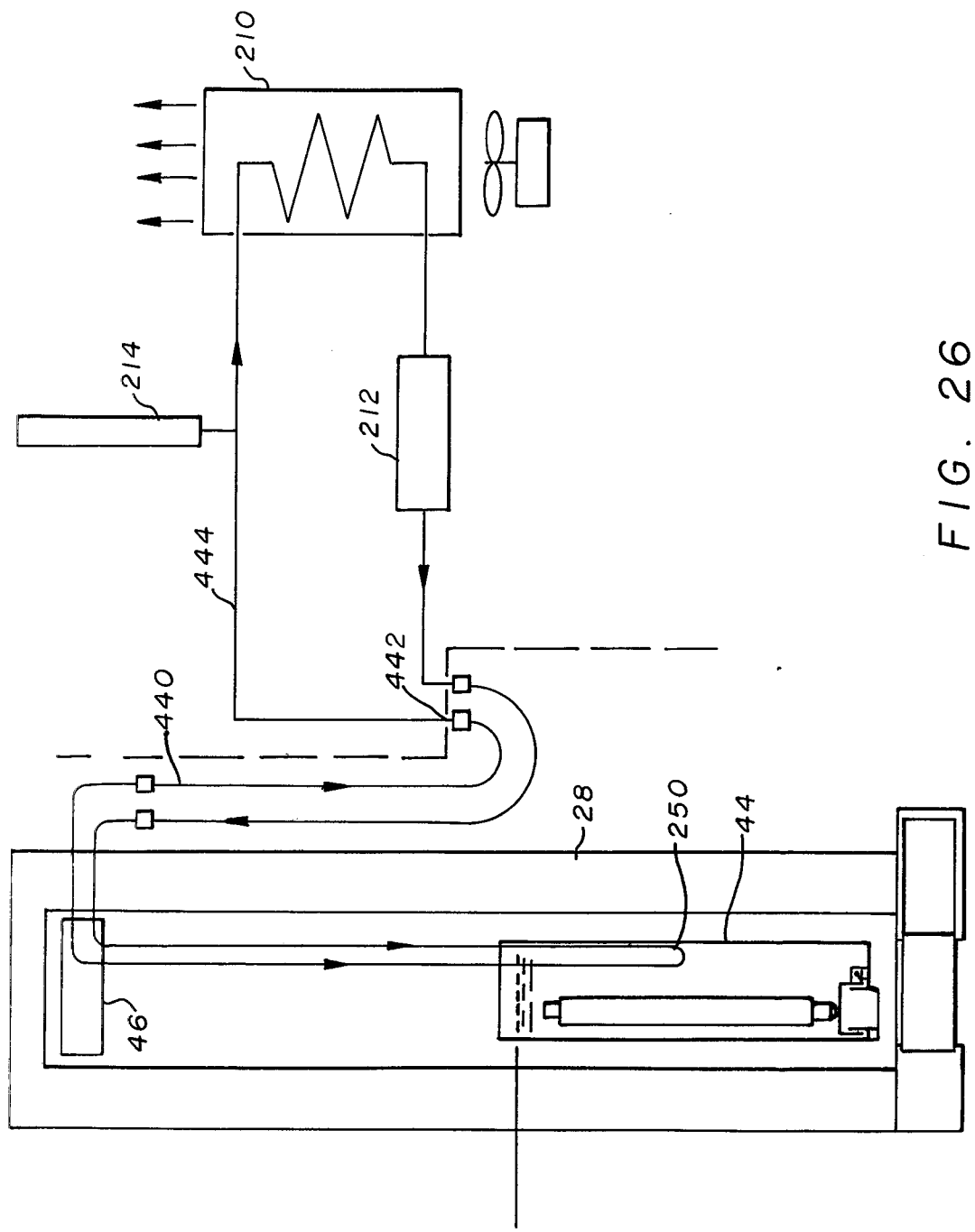
FIG. 26 is schematic of the fuel handling machine and related cooling systems.

The secondary cooling system is a hermetically sealed system filled with NaK and is shown schematically in FIG. 26. Each of the components of this system is also shown in more detail in FIGS. 13 through 15. While there are two such cooling systems, with identical components, only one circuit will be described in detail. The cooling coil 250 for removing decay heat from the liquid sodium is supported by the offset arm 332 attached to the handling tube carriage 46 (see FIG. 19). This coil extends down into the interior of the machine, passes through the upper end of the handling tube as at 438 into the tube to a predetermined depth where it makes a loop and passes upward and exits by the same route. Both the inlet and outlet legs are supported by the offset arm and directed by the arm out through the longitudinal slot 204 in the outer barrel 28 to the flexible hose cavity 206. At the upper end of the cavity the rigid tubing 250 is coupled to a length of flexible metal hose 440 which extends down into the cavity 206 (see FIG. 15) and passes back up to the point 442 where it exits from the cavity. The length of flexible hose is sufficient to permit the handling tube carriage 46 to move through its full length of travel without binding. Such an arrangement permits the cooling coil 250 to be fully immersed in the liquid sodium in the handling tube 44 at all times and thus provides full cooling from the moment a spent fuel subassembly is brought into the handling tube. The remaining components of the secondary cooling system are all mounted on the outside of the machine and include NaK pump 212, NaK-to-air heat exchanges 210, surge tanks 214 and the associated piping interconnecting these components.

Sodium Level Control System

The sodium level in the handling tube 44 must be maintained at a level 446 (see FIG. 16) above the top of the spent subassemblies at all times. In order to assure that the level is maintained within safe limits several systems are provided. The closure valve system 52 shown in FIG. 16 is the primary system for containing the sodium and has described previously. In practice, the closure valve is closed after the handling tube is immersed in the sodium pool in the reactor core and traps sodium along with the subassembly. The gripper system 52 is then used to apply a downward sealing force to the valve disc 278 by lowering the subassembly onto it, or by pressing down with the gripper itself. A sacrificial gas system is provided to place a volume of inert gas in the annular chamber 446 which is adjacent to the closure valve sealing interface 262. With such an arrangement, if a leak were to develop in the closure valve the inert gas, and not liquid sodium, will leak out.

As a backup for the closure valve and sacrificial gas system an emergency sodium supply system is provided. This system is best shown in FIG. 13 and includes a large tank of liquid sodium 216 mounted by suitable support structure on the topmost point of the machine. This tank is connected through a pair of telescoping pipes 450, 452 and a motor operated valve 454 to the interior of the handling tube. The first pipe 450 extends from the bottom of the tank through the top of the outer barrel and partway into the cavity. The second pipe 452 (see FIGS. 18 and 19) includes a guide funnel at its upper end (not shown) and is attached to the handling tube carriage 46 and extends below the level of the sodium in the handling tube 44. The motor operated valve 454 is located in the first pipe and is actuated by sodium level sensors in the handling tube which will actuate the valve to allow gravity flow of sodium into the handling tube 44 in an emergency situation.

A number of systems are employed to control the internal environment of the fuel handling machine. These systems are not shown in the figures and will not be described in detail, but are necessary to control temperature and gas quality in the interior of the machine. Briefly, for temperature control heaters are provided to maintain the temperature within the machine at a predetermined temperature, around 375° F during the refueling operation when spent subassemblies are not contained in the handling tube.

The atmosphere in the handling machine is an inert gas, preferably argon, containing less than 10 ppm of oxygen. During the period when the machine is operating to transfer spent subassemblies the interior is also exposed to sodium vapors and radioactive gases and thus various conventional means are employed to control the level of these contaminants.

Removal of a Spent Fuel Subassembly

Installation of the Handling Tube/Spreader Assembly

In preparation for removal of a spent fuel subassembly, the reactor is shut down and the control rod assembly or the like is removed from the core 12 to reveal the access port 14. In a typical arrangement a large cask containing the handling plug/spreader assembly 54 will be lowered onto and sealed against the top of the reactor. A crane and trolley arrangement contained within the transfer cask will then be operated to remove the control rod island and lower the handling plug/spreader assembly 54, with the shield plug 76 in place, into position in the access port. During this installation the spreader assembly 40 is in its full up position so that it clears the reactor core. The cask containing the control rod assembly is then removed and the floor valve 34 is placed in position above the handling plug 36 and suitably secured in this location. Once properly installed the floor valve 34 is opened and a second handling cask is placed over the valve opening and actuated to remove the shield plug 76 from the handling plug. Following this step the floor valve 34 is closed and the handling cask containing the shield plug is moved to a remote location.

The rotating plug system of the reactor is then actuated to locate the access port and thus the spreader over the desired core location. Once this is accomplished the spreader drive motors 138 are actuated to insert the spreader 40 into the core and isolate the desired fuel subassembly. As has been described, the spreader isolates the desired subassembly by engaging the camming surfaces or tabs 116 on the adjacent subassemblies and pushing them away to provide clearance from contact with the chosen subassembly. Of course, if the spreader tube 56 is not exactly aligned with the desired core position, the spreader or camming tube is permitted to freely float radially to seek the desired position.

Installation and Operation of the Spent Fuel Handling Machine

The next step in the refueling operation is to position the fuel handling machine 10 above the reactor access port 14 by operation of the gantry 22 and trolley 18 to which the machine is attached. Once axially aligned the entire machine is rotated by actuating the rotation drive 194 to bring the obround handling tube 44 into alignment with the obround opening in the floor valve 34.

Referring now to the series of FIGS. 27a–27f, FIG. 27a illustrates the handling machine 10 in the position described above, i.e., it is substantially axially aligned with the reactor access port 14 and the handling tube 44 is aligned to pass through the obround access port. It should be noted that the weight of the handling machine does not bear upon the floor valve 34, but is suspended above it. Interconnection between the machine and the reactor is accomplished by lowering the movable portion of the shield skirt 32 to engage and seal to the upper surface of the floor valve 34, thereby forming a sealed passage. Switches (not shown) mounted on the shield skirt 32 indicate when the shield skirt has properly mated with the top face of the floor valve. The space between the floor valve and the isolation valve is then purged with argon and checked for leak tightness.

Figure 27B:
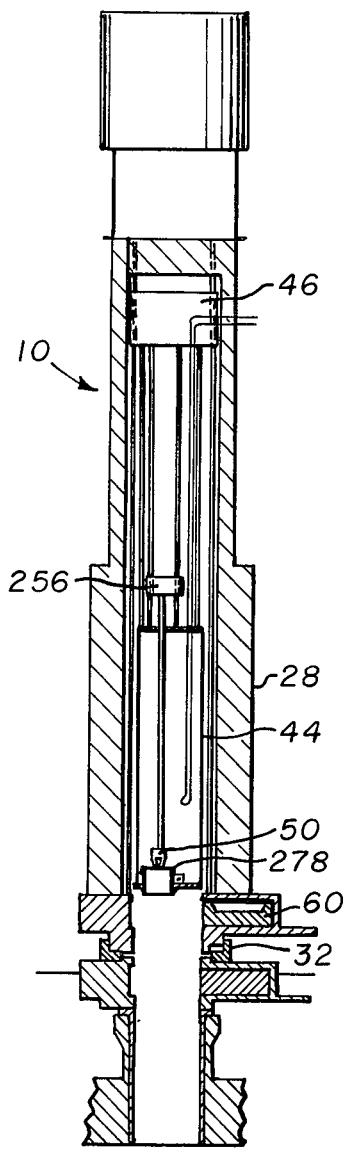

Referring now to FIG. 27b, with the handling machine 10 properly coupled to the floor valve 34 the isolation valve 60 and the floor valve 34 are opened to permit direct access to the interior of the reactor. The next step is to actuate the handling tube carriage drive 46 to insert the handling tube 44 to its full-in position. Shortly before reaching the full-in position, the tapered alignment nozzle 264 of the handling tube is engaged by the upper end 48 of the spreader camming tube and the handling tube is guided into axial alignment with the spent subassembly which has been isolated by the spreader assembly (see FIG. 4). During the time when the handling tube and spreader are being brought into alignment the swiveling motion previously described in considerable detail is experienced in the handling tube carriage 46 where the spherical top surface 320 of the swivel plate 318 contacts the spherical surface 328 of the swivel cage. This swiveling action, in the configuration shown in the drawings, permits the end of the handling tube 44 to accommodate a total 1¼ radial misalignment from the theoretical centerline.

Figure 27C:
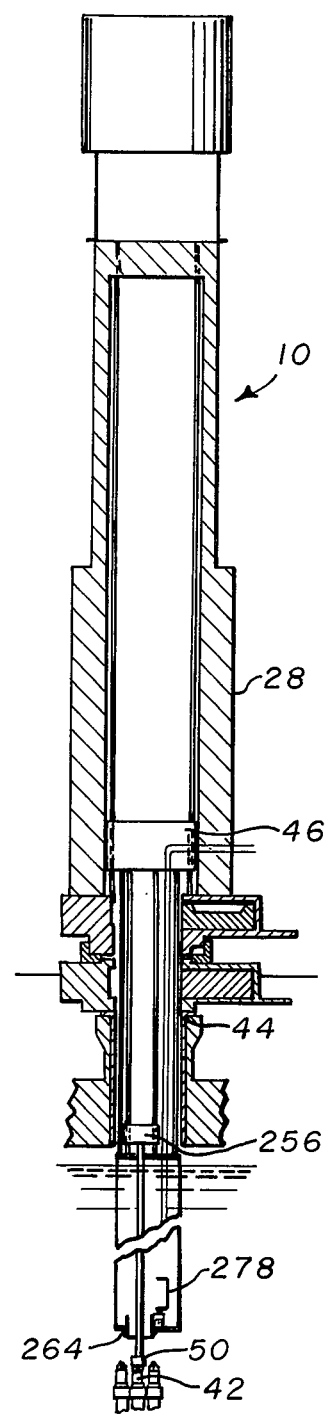

With the handling tube 44 properly aligned, the gripper carriage 256 is actuated to raise the gripper 50 above the valve disc 278 a distance sufficient to allow room for the valve disc to swing out of the way to open the passage from the handling tube. The closure valve is then opened to permit insertion of the gripper into the reactor until the pedestal contacts the upper end of the subassembly 42. The actuator rod 352 of the gripper is then inserted to its full-in position extending the fingers 342 and locking them in the full-out position to grasp the fuel assembly. FIG. 27c illustrates the handling machine in this position.

Figure 27D:
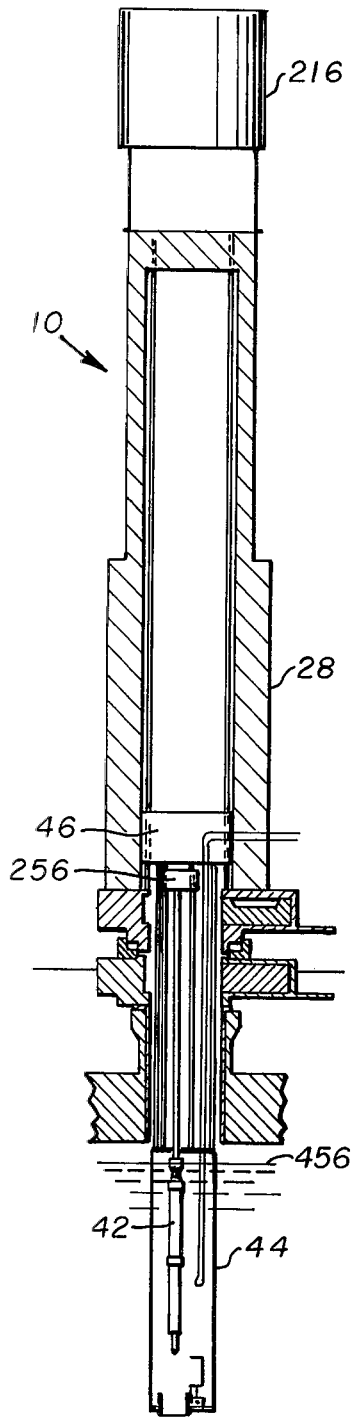
Figure 27E:
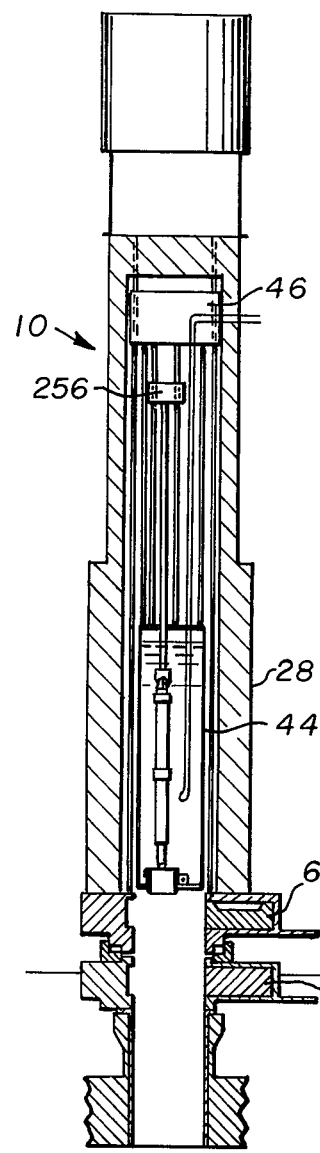
Figure 27F:
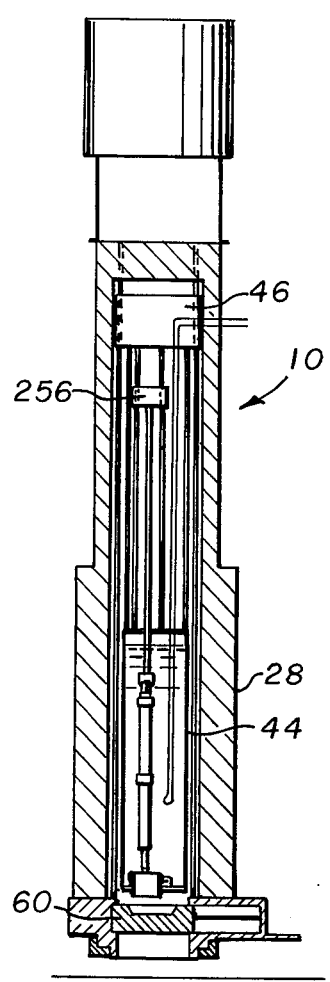

The gripper carriage drive 256 is then actuated to move upwards and withdraw the selected subassembly 42 from the core and into the handling tube 44. The core spreader prevents adjacent subassemblies from lifting out of the core while this is occurring. The spent subassembly 42 is raised within the handling tube 44 a sufficient distance above the valve seat to permit unobstructed closing of the closure valve 52. The machine is shown in this position in FIG. 27d. Referring still to FIG. 27d, it should be noted that the level of sodium 456 within the reactor, and thus in the handling tube 44, is sufficient to completely immerse the withdrawn fuel subassembly 42. Also, it should be noted that the cooling coils 250 remain fully inserted in the handling tube 44 while it is in its full down position and thus are able to provide full cooling capacity at all times.

The closure valve 50 is then closed and the gripper carriage 256 actuated to lower the spent subassembly 42 until it rests upon the top of the valve disc 278 to provide additional sealing force on the valve. Closing of the valve traps the sodium in the handling tube at the desired level above the top of the subassembly. The sacrificial inert gas is then introduced into the annular space in the closure valve as described previously.

The handling tube carriage 46 is next actuated to retract the handling tube 44 above the sodium level 456 in the reactor, and it is held in this position (see FIG. 27e) for several minutes to check for gross sodium leaks through the closure valve 50. The cooling systems are also checked for proper operation at this time.

Once it is determined that the closure valve 50 and cooling systems are operating properly the floor valve 34 and the isolation valve 60 are closed.

The space between these two valves is then purged with argon and checked for leaks. The shield skirt 32 is then raised to uncouple from the floor valve 34 and the crane 22 and trolley 18 are used to transport the handling machine 10 to the decay tank. At the decay tank, similar steps are taken to insert the handling tube 44 into the tank and to deposit the spent subassembly therein.

In an actual refueling operation, a second handling machine similar to the spent fuel handling machine just described brings a new fuel subassembly to the reactor access port and inserts it into the reactor core. The spreader assembly remains in the core during this operation to isolate the core position into which the new assembly is being inserted.

Removal of the handling plug/spreader assembly and installation of the control rod guide assemblies is accomplished by reversing the steps followed in installing these assemblies onto the reactor.

While this preferred embodiment of the invention has been shown and described, it will be understood that it is merely illustrative and that changes may be made without departing from the scope of the invention as claimed.

What is claimed is:

1. In combination a nuclear reactor and a fuel subassembly and isolating device for the reactor, said reactor including a vessel containing a coolant, a core surrounded by said coolant, said core containing a plurality of fuel subassemblies, said fuel subassemblies including handle means on the upper ends thereof, each of said handle means being configured to form a camming surface, and a closure head for said vessel containing an access port positionable above the various fuel subassembly locations; said centering and isolating device comprising: plug means for insertion into said access port, said plug having means for limiting penetration thereof into said port and further including a longitudinally extending opening therethrough of a size to permit passage of a fuel subassembly; an elongated structural tube attached to the lower end of and extending downwardly from said plug means; a downwardly extending camming tube vertically disposed under said structural tube; means for interconnecting said structural tube and said camming tube, said means permitting limited radial movement of said camming tube relative to said structural tube and being capable of raising and lowering said camming tube relative to said structural tube; said camming tube having a larger internal cross section than the external cross section of said fuel subassemblies and being configured to engage said camming surfaces of adjacent fuel subassemblies which lowered about a selected subassembly to bring said camming tube into axial alignment with said selected subassembly; whereby upon lowering said camming tube into said reactor core to isolate a selected fuel subassembly radial movement of said camming tube occurs if said tube is misaligned with said subassembly to thereby bring said tube and said subassembly into axial alignment with one another.

2. The combination of claim 1 wherein said means for interconnecting said structural tube and said camming tube comprises: axially movable rod means extending downward from within said structural tube; a substantially cylindrical housing connected to the end of said rod means for axial movement therewith; a first annular plate disposed within said housing said plate being restrained from radial or axial movement with respect to said housing, the inner diameter of said first plate being larger than the outer dimension of said camming tube; a second annular plate disposed within said housing in overlying relation with said first annular plate, the inner diameter of said second plate being larger than the outer dimension of said camming tube; a third annular plate disposed within said housing in overlying relation with said second annular plate, said third annular plate comprising an integral outward extension of the upper end of said camming tube, said camming tube extending downward through said annular plates to a level below the bottom of said first plate; means for preventing relative rotational motion between said first annular plate and said second annular plate while permitting limited motion of said second plate relative to said first plate along a single diametrical axis of said first plate; means for preventing relative rotational motion between said second annular plate and said third annular plate while permitting limited motion of said third plate relative to said second plate along a diametrical axis of said second plate perpendicular to said axis of said first plate.

3. The combination of claim 2 wherein said first annular plate is mounted for relative rotational movement with respect to said housing and including rotational drive means extending downward from within said structural tube and carried at its lower end by said housing for operationally engaging and selectively rotating said first plate, whereby upon actuating said rotational drive means said camming tube is caused to rotate.

4. The combination of claim 2 wherein said means for preventing relative rotational motion between said first annular plate and said second annular plate comprises key means longitudinally coincident with said diametrical axis of said first plate, extending from one of said first and second annular plates and a mating keyway on the other of said annular plates; and wherein said means for preventing relative rotational motion between said second annular plate and said third annular plate comprises key means longitudinally coincident with said diametrical axis of said second plate, extending from one of said second and third annular plates and a mating keyway on the other of said annular plates.

* * * * *